United States Patent [19]

Yagi et al.

[11] Patent Number: 4,675,751
[45] Date of Patent: Jun. 23, 1987

[54] PROCESSING CIRCUIT FOR TELEVISION SYNC SIGNALS PRODUCED FROM A RECORDING MEDIUM FOR PERFORMING A NON-INTERLACED DISPLAY

[75] Inventors: Motoi Yagi, Zushi; Tadao Miyabayashi, Tokyo, both of Japan

[73] Assignee: Tokyo Electric Co., Ltd., Tokyo, Japan

[21] Appl. No.: 767,162

[22] Filed: Aug. 19, 1985

[30] Foreign Application Priority Data

Aug. 24, 1984 [JP] Japan .................................. 59-176279

[51] Int. Cl.4 ............................................. H04N 5/78
[52] U.S. Cl. .................................. 360/10.1; 360/35.1; 307/234; 358/312; 358/342
[58] Field of Search ............... 358/312, 313, 320, 335, 358/337, 342; 360/10.1, 10.3, 11.1, 35.1, 33.1; 307/234

[56] References Cited

U.S. PATENT DOCUMENTS

| | | | |
|---|---|---|---|
| 3,947,870 | 3/1976 | Yumde et al. | 358/312 |
| 4,027,333 | 5/1977 | Kaisu et al. | 358/313 X |
| 4,058,840 | 11/1977 | Kasprzak | 360/10.1 |
| 4,153,917 | 5/1979 | Catano et al. | 360/10.1 |
| 4,330,791 | 5/1982 | Ohara et al. | 358/320 |

OTHER PUBLICATIONS

The Electronic Still Camera a New Concept in Photography, Kihara, Nakamura, Sati & Kambara; IEEE; pp. 325–331, 1982.

*Primary Examiner*—Aristotelis M. Psitos
*Attorney, Agent, or Firm*—Frishauf, Holtz, Goodman & Woodward

[57] ABSTRACT

A television synchronization signal processing circuit includes a reproduction/demodulation circuit for reproducing a video signal by repeatedly reading out a video signal for one field from a video signal recording medium, generating the reproduced video signal and a synchronization signal separated from the reproduced video signal, a first delay circuit for delaying the reproduced video signal read out for every other field from the reproduction/demodulation circuit by one half a period of the horizontal synchronization signal, signal transmitting circuit for transmitting a vertical synchronization signal included in the separated synchronization signal from the reproduction/demodulation circuit, and waveform synthesis circuit for synthesizing output signals from the first delay circuit and signal transmitting circuit to produce a composite video signal used for effecting video display. The signal transmitting circuit includes a second display circuit for delaying the vertical synchronization signal by a predetermined period of time shorter than one half the period of the horizontal synchronization signal.

6 Claims, 15 Drawing Figures

PROCESSING CIRCUIT FOR TELEVISION SYNC SIGNALS PRODUCED FROM A RECORDING MEDIUM FOR PERFORMING A NON-INTERLACED DISPLAY

BACKGROUND OF THE INVENTION

The invention relates to a television synchronization signal processing circuit, which is used when a video signal is read out from disk memory in a still video floppy system and displayed on a television screen.

In the standard television system, one-half interlace scanning is adopted. For example, in the NTSC system, one field is 262.5 H (H being the period of horizontal synchronization signal), and one frame consists of 2 fields, i.e., 525 H. When a reproducing signal from a video disk of the still video floppy system where the video data of one field, i.e., 262.5 H is recorded for each rotation of the disk, there is a deviation of 0.5 H in the horizontal sync pulse, i.e., one half the period of the horizontal synchronization signal, at the juncture, i.e., start or end point, of the recording track signal. This deviation causes distortion in image reproduction with an ordinary television receiver. Accordingly, it is necessary to delay the reproduced signal read out from the disk for every other field by 0.5 H from the juncture of the record to obtain a continuous reproduced horizontal sync signal.

The vertical synchronization signal, on the other hand, is not delayed at all. In this way, the standard one-half interlace scanning is performed. In this case, still picture reproduction has the following drawback. When one horizontal scanning line representing a white line is generated between two horizontal scanning lines each representing a black line, or when a horizontal scanning line is generated between two horizontal scanning lines respectively representing black and white lines, the displayed raster will vertically vibrate for every field by the distance between two adjacent horizontal scanning lines. That is, the raster of one field where the horizontal synchronization signal is delayed by 0.5 H is moved upward or downward with respect to the raster of the other field if the horizontal synchronization signal is not delayed.

To eliminate this drawback, it is necessary to control the phase of the vertical synchronization signal such that the rasters of all the fields will assume substantially the same position.

SUMMARY OF THE INVENTION

An object of the invention is to provide a television synchronization signal processing circuit, which can form a composite video signal used for the television display by repeatedly reading out a video signal for one field from a video signal recording medium, thereby effectively suppressing variations of the vertical position of the horizontal scanning lines on the display screen.

To attain the above object of the invention, there is provided a television synchronization signal waveform processing circuit, which comprises a reproduction/demodulation circuit for reproducing a video signal by repeatedly reading out a video signal for one field from a video signal recording medium, generating the reproduced video signal and a sync signal separated from the reproduced composite video signal, a first delay circuit for delaying the reproduced video signal read out for every other field from the reproduction/demodulation circuit by one half period of the horizontal synchronization signal, a second delay circuit for delaying a vertical synchronization signal included in the separated sync signal from the reproduction/demodulation circuit by a predetermined period of time shorter than one half the period of the horizontal synchronization signal, and a waveform synthesis circuit for combining the outputs of the first and second delay circuits to produce a composite video signal used for effecting video display.

According to the invention, the reproduced video signal including the sync signal is delayed for every other field by one half period H of the horizontal synchronization signal by the first delay circuit, the vertical synchronization signal in the sync signal separated from the reproduced video signal is delayed for every other field by a predetermined period of time shorter than H/2 by the second delay circuit, and the delayed reproduced video and vertical synchronization signals are combined in the waveform synthesis circuit. Thus, a composite video signal can be produced, which includes a vertical synchronization signal delayed behind the vertical synchronization signal in the reproduced video signal by a predetermined period shorter than H/2 for every other field and a video signal delayed behind the video signal in the reproduced video signal by H/2 for every other field. Thus, it is possible to reduce or eliminate the positional error between a horizontal scanning line corresponding to a horizontal synchronization signal in a field where the horizontal synchronization signal is not delayed and a corresponding horizontal scanning line in a field where the horizontal synchronization signal is delayed.

DETAILED DESCRIPTION OF THE PREFERRED EMBODIMENT

Figures 1A, 1B, 1C, 1D, 1E:
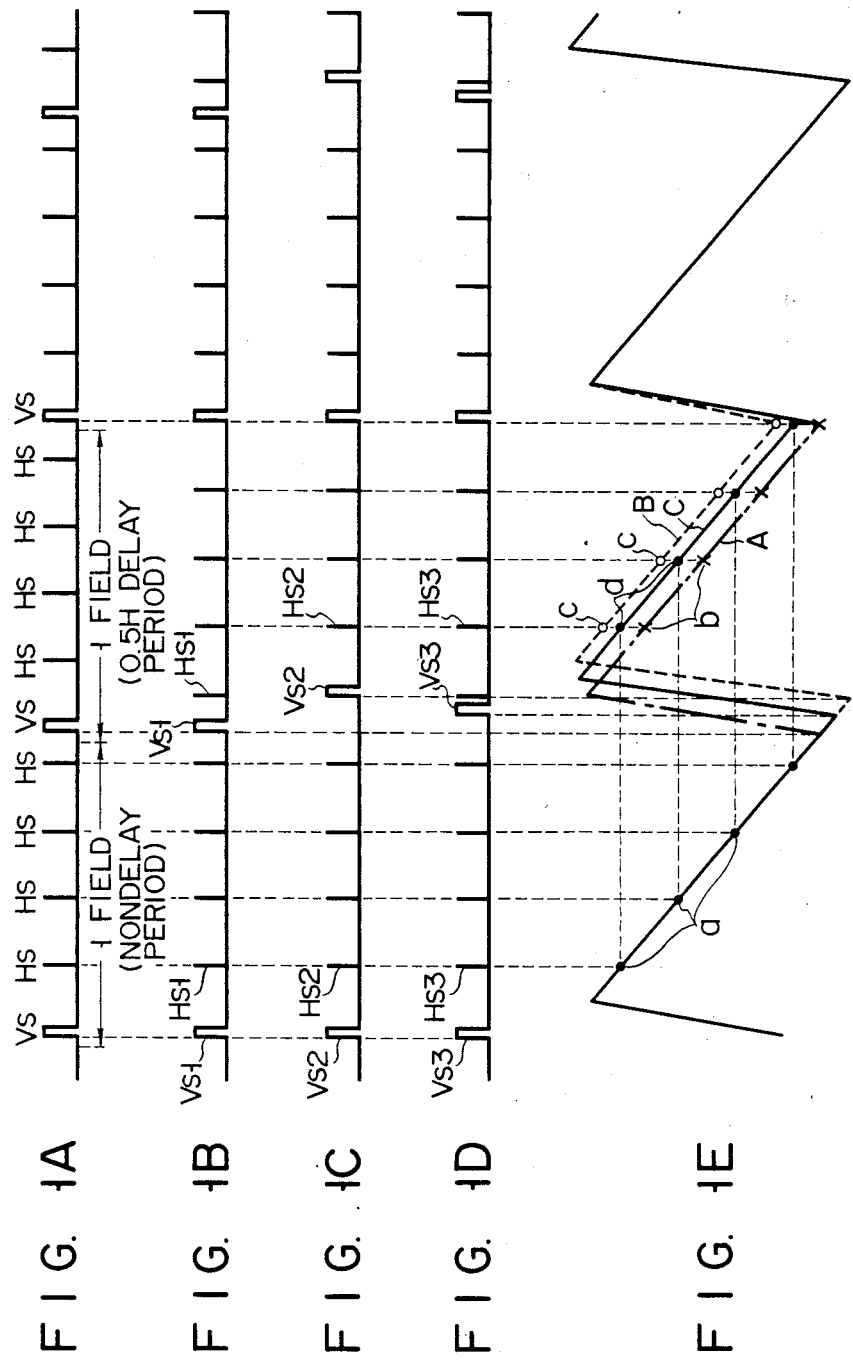
FIGS. 1A to 1E are signal waveform diagrams for explaining how the inventors have contemplated the invention.

First, how the inventors have contemplated the invention will be explained in detail with reference to FIGS. 1A to 1E. To simplify the description, one field is set to 4.5 times the period H of the horizontal synchronization signal. FIG. 1A shows synchronization pulses in a reproduced signal. Labeled at $V_S$ are vertical synchronization pulses, and at $H_S$ horizontal synchronization pulses. When only the horizontal synchronization pulses $H_S$ are delayed by 0.5 H for every other field without delaying the vertical synchronization pulses $V_S$ at all, a synchronization pulse train as shown in FIG. 1B is obtained. A vertical scanning sawtooth wave that is obtained with the vertical synchronization pulses $V_{S1}$ in the synchronization pulse train shown in FIG. 1B is as shown by imaginary line A in FIG. 1E. In this case, a horizontal scanning line corresponding to a horizontal synchronization pulse in a field where the horizontal synchronization pulses are not delayed, is at a position shown at a. On the other hand, a corresponding horizontal scanning line in a field where the horizontal synchronization pulses are delayed is at a position shown at b, which is deviated downwards in the Figure with respect to the position a. If this system is adopted, the image reproduction is vibrated vertically for every field.

Accordingly, it is contemplated to delay both the vertical synchronization pulses $V_S$ and horizontal synchronization pulses $H_S$ by 0.5 H for every other field. In this case, a synchronization pulse train as shown in FIG. 1C is obtained. A vertical scan sawtooth wave that is obtained with the vertical synchronization pulses $V_{S2}$ in this sync pulse train is as shown by a dashed line B in FIG. 1E. In this case, a horizontal scanning line corresponding to a horizontal scan pulse in a field where the synchronization pulses are not delayed, is at a position shown at a, while a corresponding horizontal scanning line in a field where the synchronization pulses are delayed is at a position shown at c, which is delayed upwards with respect to the position a. Again in this case, therefore, vertical vibrations of the image reproduction result.

With the above taken into consideration, the inventors tried to delay the horizontal synchronization pulses by 0.5 H while delaying the vertical synchronization pulses only by 0.25 H for every other field. In this case, a synchronization pulse train as shown in FIG. 1D is obtained. A vertical scan sawtooth wave that is obtained with the vertical synchronization pulses $V_{S3}$ in this pulse train is as shown by solid line C in FIG. 1E. In this case, a horizontal scanning line corresponding to a horizontal synchronization pulse in a field where the synchronization pulses are not delayed is at a position shown at a, while a corresponding horizontal line in a field where the synchronization pulses are not delayed is at a position shown at d. It is found that the positions a and d are substantially alike, that is, a still image free from vertical vibrations can be obtained through processing of the synchronization pulse train in FIG. 1D.

Figure 2:
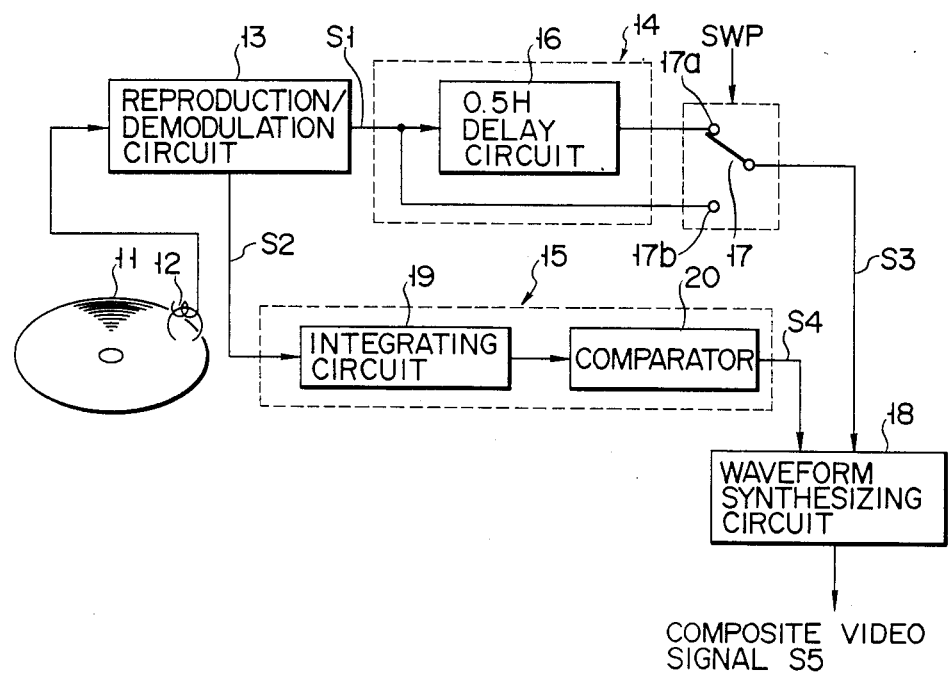
FIG. 2 is a block diagram showing an embodiment of the television synchronization signal processing circuit.

FIG. 2 shows an embodiment of the television synchronization signal waveform processing circuit according to the invention, in which a video signal for one field is repeatedly read out from a magnetic disk 11 and a composite video signal for display on a television set is generated according to the read-out video signal. The magnetic disk 11 is a video signal recording medium, on which a video signal for one field which is necessary for forming a composite video signal for displaying one frame of image in accordance with a one-half interlace scanning system is recorded at a rate of one field for each rotation. For example, various composite video signals of one field are respectively recorded on a plurality of tracks on the magnetic disk 11, and this one-field video signal is read out repeatedly to generate the video signal for display. The one-field composite video signal stored on the magnetic disk 11 is read out repeatedly at rate of 60 times a second, for instance, by a magnetic head 12 and then fed to a reproduction/demodulation circuit 13. The reproduction/demodulation circuit 13 feeds the input reproduced signal S1 to a first delay circuit 14. The circuit 13 includes a sync. separation circuit (not shown) which separates the synchronization signal S2 from the input reproduced signal and inverts the separated synchronization signal, the resultant signal being fed to a second delay circuit 15.

The first delay circuit 14 includes a 0.5-H delay circuit 16, which delays the input signal by one half the period H of the horizontal synchronization signal, and a two-contact switch 17. The reproduced signal S1 of the reproduction/demodulation circuit 13 is fed through the 0.5-H delay circuit 16 to one fixed contact 17a of the switch 17, while it is also directly fed to the other fixed contact 17b of the switch 17. The switch 17 is selectively set to the contacts 17a and 17b under the control of a switching pulse SWP, which alternately goes to a high level and a low level for every field. The reproduced signal fed to the contacts 17a and 17b is fed as selectively delayed reproduced signal S3 to a waveform synthesis circuit 18. The second delay circuit 15 includes, for instance, a single-polarity integrating circuit 19 and a comparator 20. The integrating circuit 19 integrates the input synchronization signal with a large time constant in response to the rise of the input synchronization signal while it integrates the input synchronization signal with a small time constant in response to the fall of the input synchronization signal. In other words, the input synchronization signal is integrated with a large time constant in response to the transition of the input synchronization signal away from the pedestal level of the video signal and with a small time constant in response to a transition of the input synchronization signal towards the pedestal level. The comparator 20 compares the output signal from the integrating circuit 19 with a preset reference voltage level and produces a square wave signal S4 which goes to a high level when the level of input signal becomes lower than the preset level. The square wave signal from the comparator 20 is fed to the waveform synthesis circuit 18. When the square wave signal from the comparator 20 is at low level, the waveform synthesis circuit 18 passes the reproduced signal from the switch 17 as it is. When the square wave signal from the comparator 20 is at high level, on the other hand, it provides a signal corresponding to an exclusive OR value of the reproduced signal of the switch 17 and the output signal from the comparator 20. The output signal of the waveform synthesis circuit 18 is provided as the composite video signal to be actually displayed on television screen.

Figure 3:
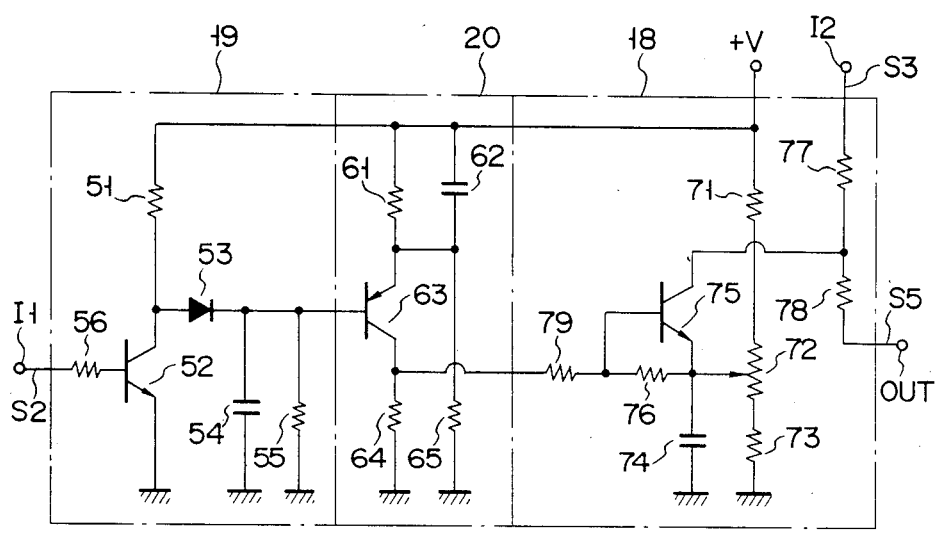
FIG. 3 is a circuit diagram showing a main portion of the television synchronization signal processing circuit according to the invention.

The single-polarity integrating circuit 19, comparator 20 and waveform synthesis circuit 18 are specifically constructed as shown in FIG. 3. In the integrating circuit 19, a first transistor 52 of npn-type is connected in series with a resistor 51 between a $+V$ terminal and ground. A parallel circuit of a charging/discharging capacitor 54 and a resistor 55 is connected in parallel with the transistor 52 through a diode 53 connected in a forward bias direction. The resistance of the resistor 51 is set to be sufficiently low compared with the resistance of the resistor 55. The charging time constant of a discharging time constant circuit which is constituted by the resistor 51, diode 53 and capacitor 54, is set sufficiently small compared with the discharging time constant of a discharging time constant circuit which is constituted by the capacitor 54 and resistor 55. The synchronization signal S2 noted above, is fed to an input terminal I1 and then through a resistor 56 to the base of the first transistor 52. In the comparator 20, a parallel circuit of a resistor 61 and a capacitor 62, a second transistor 63 of pnp-type and a resistor 64 are serially connected between the $+V$ terminal and ground. A resistor 65 is connected in parallel with a series circuit of the second transistor 63 and resistor 64. The connection point between the diode 53 and parallel circuit of the capacitor 54 and resistor 55 in the integrating circuit 19, is connected to the base of the second transistor 63. In the waveform synthesis circuit 18, a series circuit of a resistor 71, a variable resistor 72 and a resistor 73 is connected between the +V terminal and ground. A capacitor 74 is connected between the tap terminal of the variable resistor 72 and ground. A third transistor 75 of npn-type is further provided, with its emitter connected to the tap terminal of the variable resistor 72. A resistor 76 is connected between the base and emitter of the transistor 75. The collector of the third transistor 75 is connected to a connection point between resistors 77 and 78. The other terminal of the resistor 77 is connected to an input terminal I2, to which the reproduced signal noted above is supplied. The other terminal of the resistor 78 is connected to an output terminal OUT, from which the composite video signal is derived. The collector output of the second transistor 63 in the comparator 20 is fed through a resistor 79 to the base of the third transistor 75.

The operation of the embodiment of the circuit having the above construction will now be described with reference to FIGS. 4A to 4G.

Figure 4:
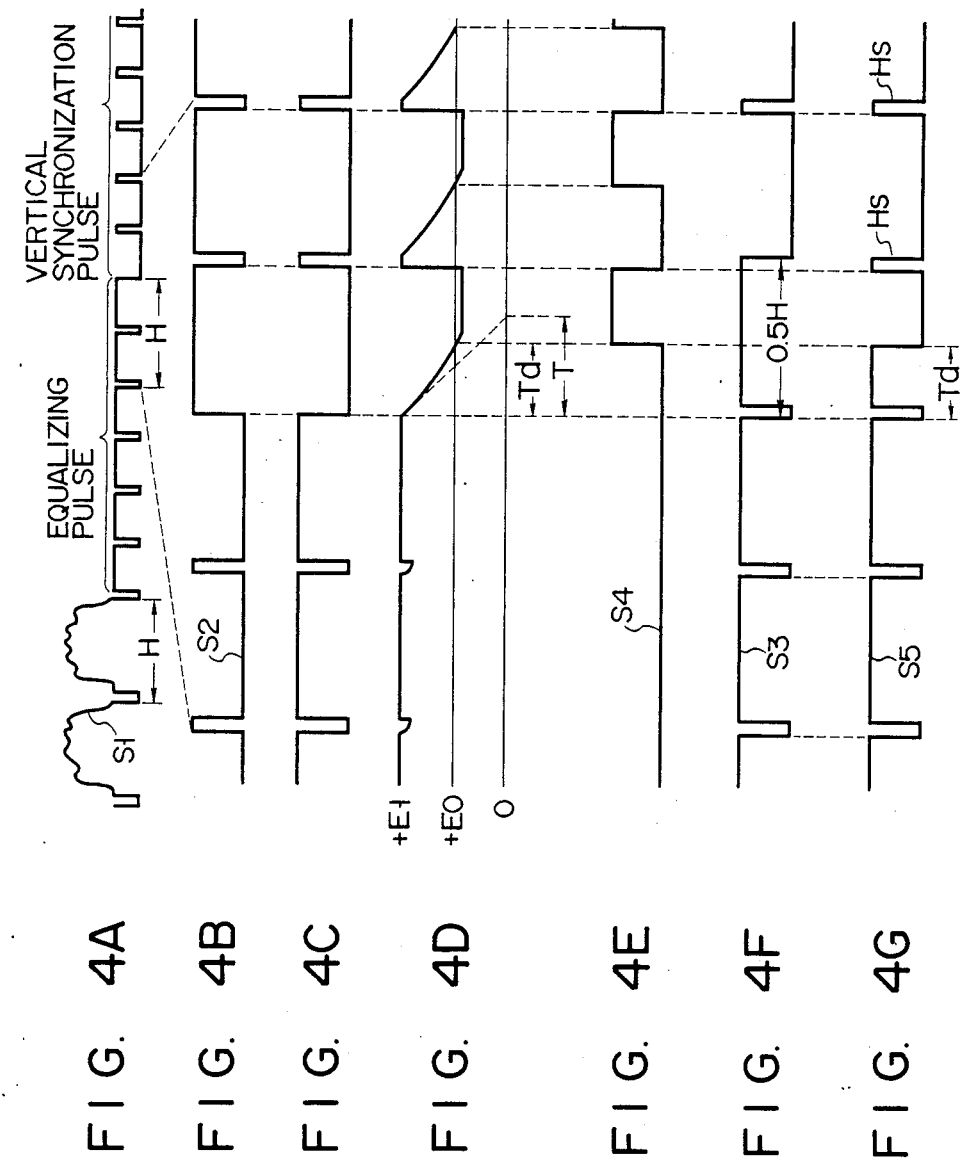
FIGS. 4A to 4G are signal waveform diagrams for explaining the operation of the television synchronization signal processing circuit shown in FIGS. 2 and 3.

The reproduction/demodulation circuit 13, which has received the reproduced signal from the magnetic head 12, produces the reproduced signal S1 as shown in FIG. 4B and the synchronization signal S2 as shown in FIG. 4B. FIG. 4B shows, to an enlarged scale, only a portion of the synchronization signal S2 indicated by dashed lines including some of the equalizing pulses and vertical synchronization pulses in the reproduced signal S1 shown in FIG. 4A, the synchronization signal S2 being fed to the integrating circuit 19. The first transistor 52 is turned on when the signal S2 goes to a high level, and it is turned off when the signal S2 goes to a low level. The collector output of the first transistor 52 is obtained as an inverted signal of the signal S2, as shown in FIG. 4C. While the first transistor 52 is "off", the capacitor 54 is charged at a comparatively high speed through the resistor 51 and diode 53. On the other hand, while the first transistor 52 is "on", the capacitor 54 is discharged at a comparatively low speed through the resistor 55. The terminal voltage across the capacitor 54 thus is changed as shown in FIG. 4D. The transistor 52 is held "on" only for a short time corresponding to an equalizing pulse. During this time, therefore, the capacitor 54 is not substantially discharged, and the terminal voltage across the capacitor is substantially held at $+E_1$. On the other hand, the first transistor 52 is "on" for a comparatively long time corresponding to a vertical synchronization pulse. During this time, therefore, the capacitor 54 is discharged through the resistor 55. The terminal voltage across the capacitor 54 is thus reduced. When the terminal voltage across the capacitor 54 is reduced at a time constant T to a level which is slightly lower than a $+E_0$ level and can substantially be determined by the resistance ratio of the resistors 61 and 65, the transistor 63 is turned on. The level $+E_0$, at which the second transistor 63 can be turned on, is set as the reference voltage level in the comparator 20. In this case, the discharge time constant of the integrating circuit 19 and the reference voltage level of the comparator 20 are set such that the second transistor 63 is turned on after the lapse of a period Td (=0.25 H) from the start of discharge of the capacitor 54 or the transition of the input signal S2 away from the pedestal level. When the input signal S2 changes towards the pedestal level and the first transistor 52 is turned off, the capacitor 54 is immediately charged at a high speed. While the second transistor 63 is kept "on", the collector thereof is kept at a high level. The comparator 20 thus produces a square wave signal S4 as shown in FIG. 4E.

The reproduced signal S3, when obtained through the 0.5-H delay circuit 16, is delayed by 0.5 H, i.e., one half the period of the horizontal synchronization signal, with respect to the reproduced signal S1 supplied from the reproduction/demodulation circuit 13, as shown in FIG. 4F. The composite video signal S5 produced from the waveform synthesis circuit 18 has a waveform as shown in FIG. 4G, in which a delay of Td (=0.25 H) is provided at the junction between the equalizing pulse series and vertical synchronization pulse series. That is, the end of the equalizing pulse series and the start of the vertical synchronization pulse series are each delayed by the delay time Td. The reproduced signal S3, when obtained directly from the reproduction/demodulation circuit 13, has the same waveform as shown in FIG. 4C. In this case, the output signal S4 from the comparator 20 cannot affect the reproduced signal S3 in the synthesis circuit 18. Therefore, the signals shown in FIGS. 4C and 4G are alternately produced as the synthesized signal from the synthesis circuit 18.

It is to be noted that when the reproduced signal is delayed by 0.5 H through the 0.5-H delay circuit 16, the vertical synchronization pulses are delayed by 0.25 H. That is, the vertical synchronization pulses are delayed by 0.25 H while the horizontal synchronization pulses are delayed by 0.5 H. Consequently, horizontal scanning lines corresponding to horizontal synchronization pulses in a field where the synchronization pulses are not delayed will be displayed on the same position as those in a field where the synchronization pulses are delayed. Thus, when the composite video signal obtained from the circuit described above is used, a clear still picture display substantially free from vertical vibrations can be obtained on a television screen.

In addition, since the circuit for delaying vertical synchronization pulses for 0.25 H is constituted by the single polarity integrating circuit 19 and comparator 20, the circuit is simple in construction. Further, with this construction, horizontal synchronization pulses $H_S$ may be contained in the vertical synchronization signal. In this case, unlike the case of the vertical synchronization signal which does not contain any horizontal synchronization pulse, the vertical vibration suppression effect will never become unstable due to the scanning circuit of a television monitor.

Figure 5:
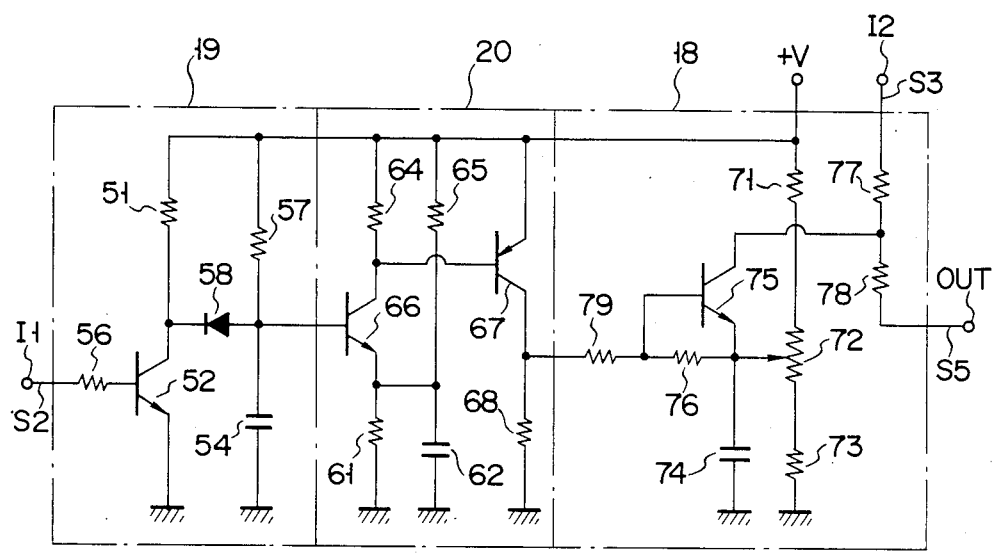
FIG. 5 is a view similar to FIG. 3 but showing a modification of the circuit shown in FIG. 3.

A different embodiment of the invention will now be described with reference to FIG. 5. In the Figure, parts similar to those in the preceding embodiment are designated by the same reference numerals, and their description is omitted.

In this embodiment, a diode 58 of the opposite polarity to the diode 53 in the single polarity integrating circuit 19 in the preceding embodiment is used in lieu of the diode 53, and a resistor 57, which is connected between the +V terminal and the connection point between capacitor 54 and diode 58, is used in lieu of the resistor 55 in the preceding embodiment. Further, a fourth transistor 66 of npn-type is used in lieu of the second transistor 63 in the comparator 20. Further, a terminal of the parallel circuit of resistor 61 and capacitor 62 is grounded instead of being connected to the +V terminal, and one terminal of resistors 64 and 65 is connected to the +V terminal instead of being grounded. Further, a series circuit of a fifth transistor 67 of pnp-type and a resistor 68 is connected between the +V terminal and ground. The base of the transistor 67 is connected to the collector of the fourth transistor 66, and the collector of the transistor 67 is used as an output terminal of the comparator 20. The waveform synthesis circuit 18 has the same construction as in the preceding embodiment.

With the above construction, when the first transistor 52 is "off", the capacitor 54 is charged through the resistor 57. The fourth transistor 66 is turned on when the terminal voltage across the capacitor 54 has reached a preset reference voltage level. When the fourth transistor 66 is turned on, the fifth transistor 67 is also turned on, whereupon a high level signal S4 is produced from the collector of the transistor 67. When the first transistor 52 is turned on, the capacitor 54 is discharged quickly through the diode 58 and first transistor 52.

This circuit is used where the synchronization signal S2 fed to the input terminal I1 has the opposite polarity to that of the synchronization signal described before in connection with the previous embodiment, and the same effects as in the previous embodiment can be obtained with this circuit.

This invention has been described with reference to the embodiments, but this invention is not limited thereto.

For example, the above embodiments were concerned with the case when a magnetic disk is used as the video signal recording medium, but an optical disk or a digital field memory can also be used.

Further, although in the above embodiments the second delay circuit has been constituted by the single-polarity integrating circuit and comparator, this is by no means limitative.

Furthermore, although the delay time of the second delay circuit 15 in the above embodiments has been set to ¼ H, a different delay time shorter than ½ H may be set as well for the suppression of vibrations of the image reproduction.

What is claimed is:

1. A television synchronization signal processing circuit, comprising:
  a reproduction and demodulation circuit means for reproducing a video signal by repeatedly reading out a video signal for one field from a video signal recording medium upon which is stored a video signal of a plurality of fields in accordance with a one-half scanning system, and for generating said reproduced video signal and a synchronization signal separated from said reproduced video signal;
  a first delay means coupled to said reproduction and demodulation circuit means for delaying said reproduced video signal read out for every other field by one half a period of the horizontal synchronization signal, said first delay means transmitting said reproduced video signal read out for the remaining field without any delay;
  a second delay signal means coupled to said reproduction and demodulation circuit means for delaying a vertical synchronization signal included in said separated synchronization signal by a predetermined period of time larger than zero and shorter than one half the period of the horizontal synchronization signal; and
  a waveform synthesis circuit means for combining the outputs of said first and second delay means to produce a composite video signal used for performing substantially non-interlaced display.

2. A signal processing circuit according to claim 1, wherein said first delay means includes a first circuit means for delaying the video signal supplied from said reproduction and demodulation circuit means by a period of time equal to half the period of the horizontal synchronization signal, and a selection circuit means connected to said reproduction and demodulation circuit means and to said first circuit means to alternately supply one of the output signals from said reproduction and demodulation circuit means and from the first circuit means to said synthesis circuit means.

3. A signal processing circuit according to claim 2, wherein said second delay means includes a single-polarity integrating circuit for integrating the synchronization signal supplied from said reproduction/demodulation circuit with a preset time constant in response to the transition of the synchronization signal from a pedestal level of the video signal and a comparator circuit for comparing an output signal from said single-polarity integrating circuit with a reference signal to supply an output signal to said synthesizing circuit in accordance with the result of comparison.

4. A signal processing circuit according to claim 2, wherein said second delay means includes a single-polarity integrating circuit for integrating the synchronization signal supplied from said reproduction/demodulation circuit with a large time constant in response to the transition of the synchronization signal from a pedestal level of the video signal and with a small time constant in response to the transition of the synchronization signal towards the pedestal level, and a comparator circuit for comparing an output signal from said single-polarity integrating circuit with a reference signal to supply an output signal to said synthesizing circuit in accordance with the result of comparison.

5. A signal processing circuit according to claim 1, wherein said second delay means includes a single-polarity integrating circuit for integrating the synchronizaton signal supplied from said reproduction/demodulation circuit with a preset time constant in response to the transition of the synchronization signal from a pedestal level of the video signal and a comparator circuit for comparing an output signal from said single-polarity integrating circuit with a reference signal to supply an output signal to said synthesizing circuit in accordance with the result of comparison.

6. A signal processing circuit according to claim 1, wherein said second delay means includes a single-polarity integrating circuit for integrating the synchronization signal supplied from said reproduction/demodulation circuit with a large time constant in response to the transition of the synchronization signal from a pedestal level of the video signal and with a small time constant in response to the transition of the synchronization signal towards the pedestal level, and a comparator circuit for comparing an output signal from said single-polarity integrating circuit with a reference signal to supply an output signal to said synthesizing circuit in accordance with the result of comparison.

* * * * *